(12) United States Patent
Bang et al.

(10) Patent No.: US 9,865,365 B2
(45) Date of Patent: Jan. 9, 2018

(54) DECAY HEAT REMOVAL SYSTEM WITH HYBRID HEAT PIPE HAVING COOLANT AND NEUTRON ABSORBER FOR COOLING NUCLEAR POWER PLANT

(71) Applicant: UNIST Academy-Industry Research Corporation, Ulsan (KR)

(72) Inventors: In Cheol Bang, Ulsan (KR); Ji Hyun Kim, Ulsan (KR); Seong Dae Park, Ulsan (KR); Sarah Kang, Yeongyang-gun (KR); Han Seo, Ulsan (KR); Kyoung-Mo Kim, Busan (KR); Sung Bo Moon, Ulsan (KR); Seok Bin Seo, Busan (KR); In Guk Kim, Ulsan (KR); Yeong Shin Jeong, Ulsan (KR); Hyo Heo, Ansan-si (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 658 days.

(21) Appl. No.: 14/335,324

(22) Filed: Jul. 18, 2014

(65) Prior Publication Data
US 2015/0023461 A1 Jan. 22, 2015

(30) Foreign Application Priority Data
Jul. 18, 2013 (KR) .......................... 10-2013-0084657

(51) Int. Cl.
*G21C 15/18* (2006.01)
*G21C 7/12* (2006.01)
(Continued)

(52) U.S. Cl.
CPC ............... *G21C 15/18* (2013.01); *G21C 7/12* (2013.01); *G21C 15/26* (2013.01); *G21C 19/08* (2013.01);
(Continued)

(58) Field of Classification Search
CPC ........ Y02E 30/39; G21C 7/103; G21C 15/18; G21C 7/00; G21C 1/322; G21C 1/326;
(Continued)

(56) References Cited

U.S. PATENT DOCUMENTS

| 3,243,613 A | * | 3/1966 | Grover ..................... G21C 3/40 165/104.26 |
| 3,935,063 A | * | 1/1976 | Dunckel ............. F28D 15/0275 165/104.21 |
| 5,253,702 A | * | 10/1993 | Davidson ............ F28D 15/0233 165/104.14 |

FOREIGN PATENT DOCUMENTS

KR 2013-0047871 A 5/2013

* cited by examiner

*Primary Examiner* — Marshall P O'Connor
(74) *Attorney, Agent, or Firm* — Rabin & Berdo, P.C.

(57) ABSTRACT

Disclosed is a decay heat removal system for cooling the decay heat of a reactor core and the spent fuel. The decay heat removal system including: a first heat pipe which is placed in an upper plenum of the reactor vessel and arranged in upward and downward directions corresponding to a position of an insertion hole formed on a top of the nuclear fuel assemblies; a control rod drive mechanism which is connected to an upper portion of the first heat pipe and drives the first heat pipe to move up and down so that the first heat pipe can be selectively inserted in a control rod insertion hole of the reactor core arranged in the nuclear reactor vessel; and a second heat pipe which is coupled to and in close contact with a bottom surface of the reactor vessel and removes the decay heat generated in the reactor core.

12 Claims, 5 Drawing Sheets

(51) Int. Cl.
*G21C 15/26* (2006.01)
*G21C 19/08* (2006.01)
G21C 7/103 (2006.01)
G21C 19/07 (2006.01)

(52) U.S. Cl.
CPC ............. *G21C 7/103* (2013.01); *G21C 19/07* (2013.01); *Y02E 30/39* (2013.01)

(58) Field of Classification Search
CPC ...... G21C 3/326; G21C 15/02; G21C 15/257; G21C 15/28; G21C 1/086; G21C 15/00; G21C 7/06; G21C 13/04; G21C 19/07
See application file for complete search history.

DECAY HEAT REMOVAL SYSTEM WITH HYBRID HEAT PIPE HAVING COOLANT AND NEUTRON ABSORBER FOR COOLING NUCLEAR POWER PLANT

CROSS-REFERENCE TO RELATED APPLICATION

This application claims priority to and the benefit of Korean Patent Application No. 10-2013-0084657 filed in the Korean Intellectual Property Office on Jul. 18, 2013, the entire contents of which are incorporated herein by reference.

BACKGROUND OF THE INVENTION (a) Field of the Invention

The present invention relates to a decay heat removal system for cooling a nuclear power plant, and more particularly to a decay heat removal system with a hybrid heat pipe having a neutron absorber and a coolant for cooling a reactor core, which is installed in a nuclear reactor vessel, a nuclear fuel storage facility or the like nuclear power plant, and the hybrid heat pipe having the neutron absorber and the coolant is used to remove decay heat of a reactor core arranged in a nuclear reactor vessel or remove decay heat of spent fuel.

(b) Description of the Related Art

In general, when an accident occurs in a nuclear reactor, a coolant is injected to a primary system and cools a heated nuclear reactor vessel in order to remove decay heat generated from a reactor core arranged in the reactor vessel.

However, if the supply of the coolant is restricted by the accident, it is impossible to remove the decay heat of the reactor core. Further, if a corium leaks out of the nuclear reactor vessel even though the coolant is supplied, a problem can arise in that a secondary accident such as a steam explosion may occur due to vapor from evaporation of the coolant inside pressure vessel.

Also, the decay heat of the reactor core is removed by an indirect cooling method that the coolant supplied through the primary system cools the nuclear reactor vessel while being in contact with an external surface of the nuclear reactor vessel, and therefore a problem arises in that an efficiency of removing the decay heat of the reactor core is decreased.

RELATED REFERENCE

Patent Document
1. Korean Patent Publication No. 2013-0047871 (May 9, 2013), entitled 'device for residual heat removal of integrated reactor and its method.'

SUMMARY OF THE INVENTION

Accordingly, the present invention is conceived to solve the forgoing problems, and an aspect of the present invention is to provide a decay heat removal system with a hybrid heat pipe having a neutron absorber and a coolant for cooling a nuclear power plant, in which occurrence of a secondary accident is prevented due to vapor because decay heat of a reactor core arranged in a reactor vessel is removed by the heat pipe, and the decay heat is removed through direct contact with the reactor core or nuclear fuel generating the decay heat.

In accordance with an aspect of the present invention, there is a decay heat removal system to remove decay heat of a reactor core arranged in a nuclear reactor vessel, the decay heat removal system including: a first heat pipe which is placed in an upper plenum of the reactor vessel and arranged in upward and downward directions corresponding to a position of an insertion hole formed on a top of the reactor vessel; a control rod drive mechanism which is connected to an upper plenum of the first heat pipe and drives the first heat pipe to move up and down so that the first heat pipe can be selectively inserted in a control rod insertion hole of the reactor core arranged in the nuclear reactor vessel; and a second heat pipe which is coupled to and in close contact with a bottom surface of the nuclear reactor vessel and removes the decay heat generated in the reactor core.

Here, the first heat pipe may have a heat sink with the coolant from an upper plenum of the nuclear reactor vessel as a condenser, or be connected to an independent condenser cooling tank, and perform cooling by absorbing the decay heat generated in the reactor core, and transferring the absorbed heat to the coolant Here, the temperature of the coolant in an upper plenum, i.e., in a condenser of the first heat pipe may be maintained or adjusted by convection of the coolant based on connection between the upper plenum and an in-containment refueling water storage tank, cooling based on a heat exchanger using heat pipes additionally installed in the upper plenum, or cooling based on a cooling tank provided on an outer wall of the upper plenum.

Here, the second heat pipe may include a first end coupled to a storage tank provided in a containment building, and a second end attached to the bottom surface of the nuclear reactor vessel, and perform the cooling by receiving the coolant stored in the storage tank to the condenser, absorbing the decay heat generated in the reactor core and transferring the absorbed heat to the coolant.

Also, the second heat pipe may be made of a flexible material, be curved corresponding to the shape of the bottom surface of the nuclear reactor vessel, and closely contact the bottom surface.

Also, the second heat pipe may have a bellows-like structure, be curved corresponding to the shape of the bottom surface of the nuclear reactor vessel, and closely contact the bottom surface.

Also, a working fluid circulated in the first heat pipe or the second heat pipe may include one of water ($H_2O$), a nanofluid, a refrigerant, mercury (Hg), lithium (Li) and FLiBe ($LiF$-$BeF_2$).

Also, a wick placed in the first heat pipe or the second heat pipe may include one of carbon fiber, copper, stainless steel, zirconium alloy, silicon carbide (SiC), and boron carbide ($B_4C$).

Also, a case material forming an outer appearance of the first heat pipe or the second heat pipe includes one of stainless steel, zirconium alloy, inconel alloy and molybdenum alloy.

In accordance with an aspect of the present invention, there is provided a decay heat removal system to remove decay heat of a spent nuclear fuel, the decay heat removal system including: a plurality of unit storage racks which includes a plurality of standing heat pipe plates coupled to one another and assembled in the form of a box to internally form a spent fuel storage for storing the nuclear fuel, in which a working fluid is circulated inside the heat pipe plate and absorbs the decay heat of the spent fuel.

Here, the respective unit storage racks may be arranged and close to each other in the storage space where a coolant for removing the decay heat of the spent fuel.

Also, the decay heat removal system may further include a third heat pipe inserted in a control rod insertion hole penetrating a middle of the fuel assemblies, and internally circulating a working fluid to absorb the decay heat from the inside of the nuclear fuel.

In accordance with an aspect of the present invention, there is provided a decay heat removal system for cooling the nuclear power plant to remove decay heat of spent nuclear fuel, the decay heat removal system including: a storage container which forms an internal space for storing the spent fuel assemblies; a fourth heat pipe which is horizontally arranged in the form of traversing the internal space of the storage container, and circulates a working fluid therein to absorb the decay heat of the spent fuel; and a fifth heat pipe which is horizontally arranged in the form of traversing the internal space of the storage container, is installed in a direction of intersecting the fourth heat pipe, and, together with the fourth heat pipe, forms a rectangular storage space in which the spent fuel is arranged.

Here, the fourth heat pipes and the fifth heat pipes may be spaced apart from each other at a distance corresponding to a horizontal length of a storage unit for the spent fuel, and closely contact circumference of the nuclear fuel.

Also, the storage container may be supplied with and store a coolant for removing the decay heat of the spent fuel assemblies.

Meanwhile, the decay heat removal system may further include a sixth heat pipe inserted in a control rod insertion hole penetrating the middle of the nuclear fuel assembly, and internally circulating a working fluid to absorb the decay heat from the inside of the spent fuel.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Hereinafter, exemplary embodiments according to the present invention will be described with reference to accompanying drawings. Also, terms and words used in the following description and claims have to be interpreted by not the limited meaning of the typical or dictionary definition, but the meaning and concept corresponding to the technical idea of the present invention on the assumption that the inventor can properly define the concept of the terms in order to describe his/her own invention in the best way.

Figure 1:
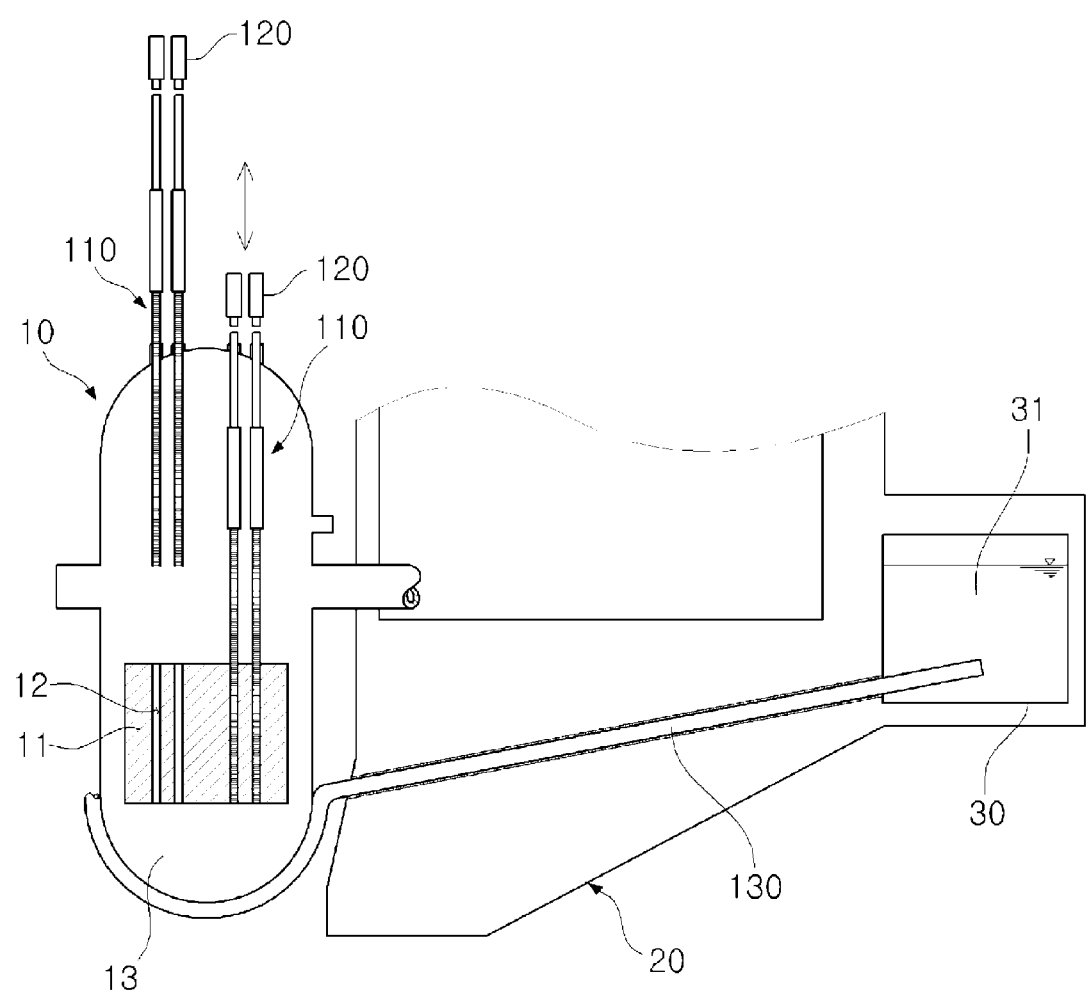
FIG. 1 is a schematic view showing a configuration of a decay heat removal system for cooling a reactor core according to a first embodiment of the present invention.

First, a decay heat removal system with a hybrid heat pipe having a neutron absorber and a coolant for cooling reactor core (hereinafter, referred to as a 'decay heat removal system') according to a first embodiment of the present invention will be described with reference to FIG. 1.

According to the first exemplary embodiment, the decay heat removal system for cooling the nuclear power plant is installed in a nuclear reactor vessel 10, and removes decay heat of a reactor core 11 arranged in the reactor vessel 10. As shown in FIG. 1, the decay heat removal system for cooling a reactor core includes a first heat pipe 110, a control rod drive mechanism 120 and a second heat pipe 130.

The first heat pipe 110 is a cooling means inserted in the reactor core 11 arranged inside the reactor vessel 10 and directly removing the decay heat generated from the reactor core 11. Further, the first heat pipe 110 is placed above the reactor vessel 10 and arranged in upward and downward directions so as to correspond to a position of an insertion hole formed on a top of the reactor core 11.

Here, the first heat pipe 110 is inserted into the reactor core 11 through the insertion hole formed on the top of the reactor vessel 10, and has a lower portion to be inserted in a control rod insertion hole 12 formed in the reactor core 11 arranged inside the nuclear reactor vessel 10, thereby removing the decay heat of the reactor core 11.

To this end, the first heat pipe 110 has an outer diameter corresponding to a control rod to be inserted in the reactor core 11, and the spaced positions among the first heat pipes 110 correspond to spaced positions among a plurality of control rod insertion holes 12 formed in the reactor core 11 so that the first heat pipes 110 can be respectively inserted in the control rod insertion holes 12, thereby removing the decay heat of the reactor core 11. Here, the control rod insertion hole 12 refers to a previously formed insertion hole in which the control rod to be arranged in the reactor vessel 10 can be inserted.

Thus, there is no need of separately forming an additional insertion hole through which the first heat pipe 110 can be inserted in the reactor core 11, and therefore the first heat pipe 110 can be applied as a cooling facility to the existing nuclear reactor system without changing the design of the reactor core 11.

The control rod drive mechanism 120 is a driving means connected to the first heat pipe 110 and driving the first heat pipe 110 to move up and down. That is, the control rod drive mechanism 120 is connected to the top of the first heat pipe 110 and drives the first heat pipe 110 to move up and down so that the first heat pipe 110 can be selectively inserted in the control rod insertion hole 12 of the reactor core 11 arranged in the nuclear reactor vessel 10.

Here, the control rod drive mechanism 120 may be controlled in accordance with a control signal from a control system of a nuclear power plant. When an accident occurs, the control system outputs a control signal to the control rod drive mechanism 120 in order to move the first heat pipe 110 down, and the control rod drive mechanism 120 moves down in response to a received control signal, thereby inserting the first heat pipe 110 in the reactor core 11.

Figure 5:
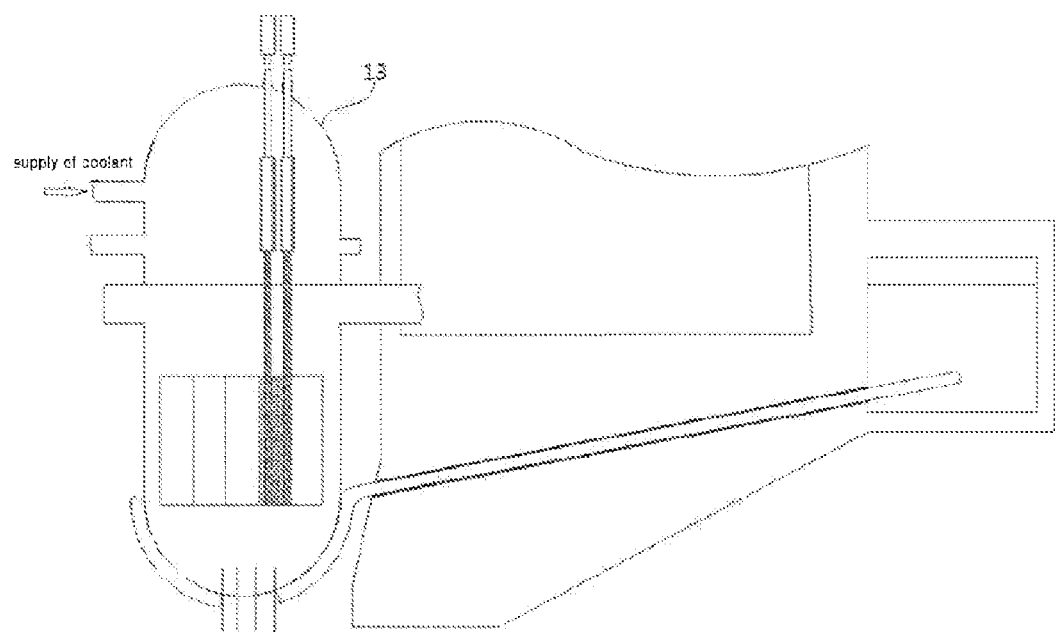
FIG. 5 is a perspective view of the decay heat removal system for cooling the reactor core according to the present invention, in which condenser cooling tank is formed in an upper plenum of a reactor vessel.

Here, as shown in FIG. 5 the first heat pipe 110 receives the coolant from the upper plenum 14 of the nuclear reactor vessel 10 to a condenser, and transfers the decay heat generated in the reactor core 11 to the coolant, thereby performing the cooling.

Here, the temperature of the coolant in the upper plenum, i.e., in the condenser of the first heat pipe 110 may be maintained or adjusted by convection of the coolant based on connection between the upper plenum and an in-containment refueling water storage tank, cooling based on a heat pipe heat exchanger additionally installed in the upper plenum, or cooling based on a condenser cooling tank provided on an outer wall of the upper plenum.

For reference, FIG. 5 is a perspective view of the decay heat removal system for cooling a reactor core according to the present invention, in an upper plenum of the reactor vessel.

The second heat pipe 130 is a cooling means for secondarily removing the decay heat of the reactor core 11 together with the first heat pipe 110. As shown in FIG. 1, the second heat pipe 130 is provided to closely contact a bottom surface of the nuclear reactor vessel 10 and absorbs the decay heat generated in the reactor core 11, thereby performing the cooling.

Here, the second heat pipe 130 has a first end coupled to an in-containment refueling water storage tank 30 provided, and a second end attached to the bottom surface 13 of the reactor vessel 10. Further, the second heat pipe 130 receives the coolant 31 stored in the storage tank 30 to the condenser, absorbs the decay heat generated in the reactor core 11 and transfers it to the coolant 31, thereby performing the cooling.

Also, the second heat pipe 130 is curved for the close contact along the hemispherical shape of the bottom surface 13 of the reactor vessel 10. To this end, the second heat pipe 130 is made of a flexible material and curved corresponding to the shape of the bottom surface 13 of the nuclear reactor vessel 10, thereby closely contacting the bottom surface 13. Further, the second heat pipe 130 may have a bellows-like structure, and be connected to and be in close contact with the bottom surface 13 as being curved along the shape of the bottom surface 13 of the nuclear reactor vessel 10.

Further, the second heat pipe 130 is provided to be curved to change its shape freely. Therefore, even though a wall of the containment building 20 or other obstacles are placed between the reactor vessel 10 and the in-containment refueling water storage tank 30, the second heat pipe 130 can be curved corresponding to the shape of the wall or obstacle, thereby having an effect on being directly installed without changing the facility of the current nuclear power plant.

Also, a working fluid circulated in the first heat pipe 110 or the second heat pipe 130 may include one of water ($H_2O$), a nanofluid, a refrigerant, mercury (Hg), lithium (Li) and FLiBe ($LiF-BeF_2$). A wick placed in the first heat pipe 110 or the second heat pipe 130 may include one of carbon fiber, copper (Cu), stainless steel, zirconium alloy, silicon carbide (SiC), and boron carbide ($B_4C$).

Further, a case material forming an outer appearance of the first heat pipe 110 or the second heat pipe 130 may include one of stainless steel, zirconium alloy, inconel alloy and molybdenum alloy.

Also, the first heat pipe 110 or the second heat pipe 130 are provided in the form of a hybrid heat pipe internally provided with both the neutron absorber and the coolant, thereby not only absorbing neutrons generated in the reactor core 11 of the reactor vessel 10 but also removing the generated decay heat.

Figure 4:
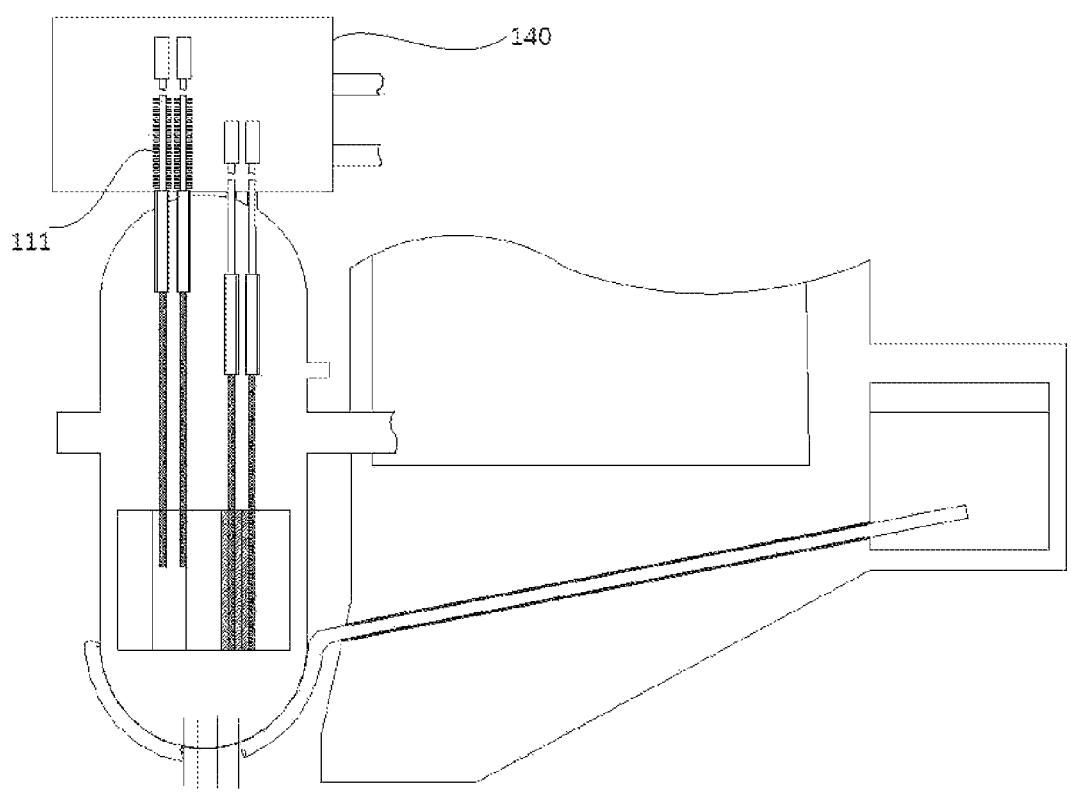
FIG. 4 is a perspective view showing a configuration of a condenser cooling tank and a fin at the condenser part according to the present invention.

At this time, referring to FIG. 4, a fin 111 may be provided in the condenser of the first heat pipe 110 and secure a heat transfer area, which employs air, water, nanofluid, seawater, nitrogen or liquid metal as a coolant for exchanging heat with the first heat pipe.

In the decay heat removal system for cooling reactor core with the foregoing elements and functions according to the first embodiment of the present invention, the decay heat of the reactor core 11 arranged in the nuclear reactor vessel 10 is removed by the heat pipes 110 and 120, thereby preventing occurrence of a secondary accident due to vapor, and maximizing a cooling efficiency because the decay heat is removed by direct contact with the reactor core 11 generating the decay heat.

Next, elements and functions of a decay heat removal system 40 for cooling the spent fuel according to a second embodiment of the present invention will be described with reference to FIG. 2.

Figure 2:
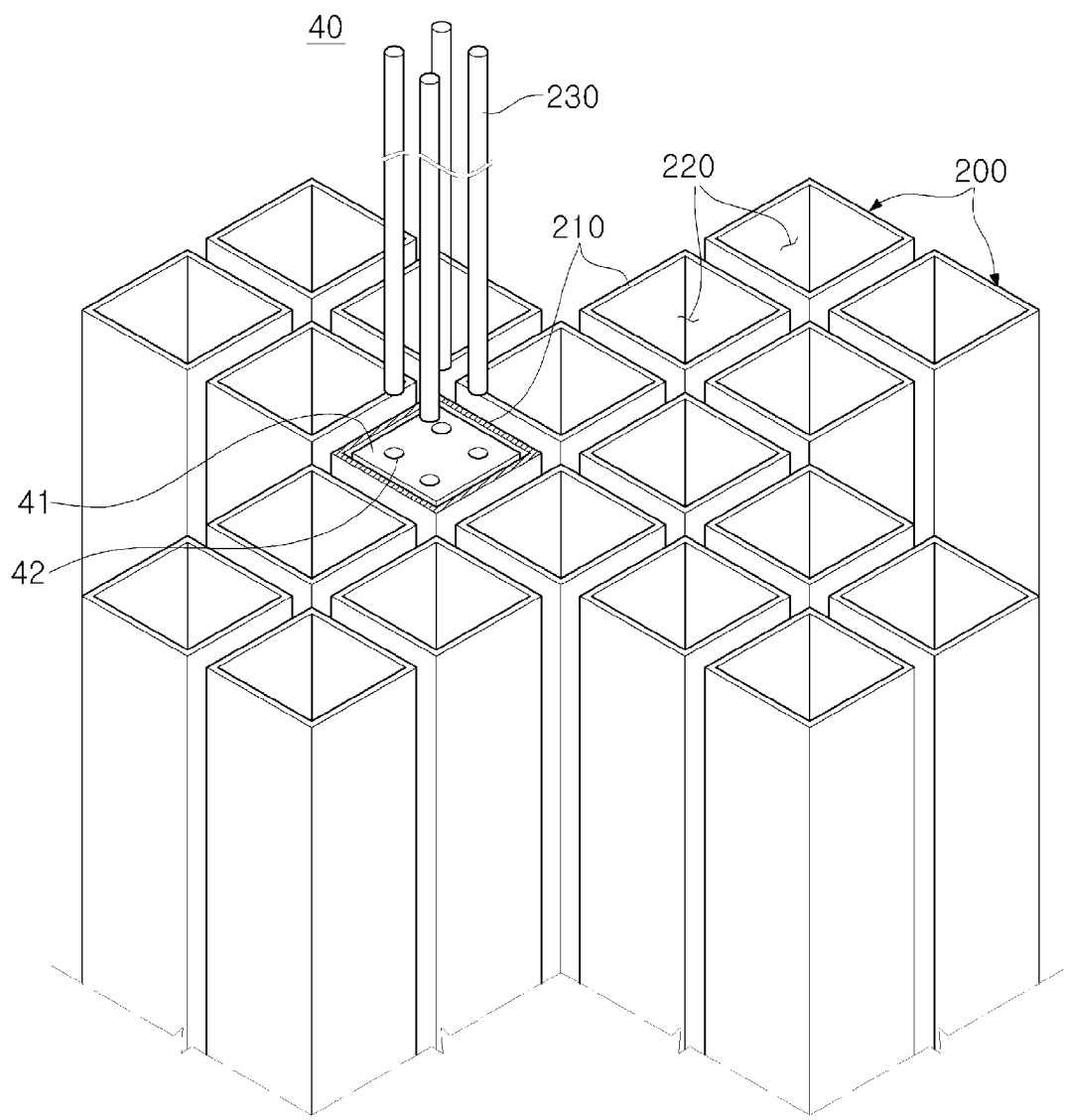
FIG. 2 is a perspective view showing a configuration of a decay heat removal system for cooling a the spent fuel according to a second embodiment of the present invention.

Referring to FIG. 2, the decay heat removal system 40 for cooling the spent fuel assemblies according to the second embodiment of the present invention is a cooling system for removing the decay heat of the spent nuclear fuel assemblies 41. As shown in FIG. 2, the decay heat removal system 40 has a plurality of unit storage racks 200 that includes a plurality of standing heat pipe plates 210 coupled to one another and assembled in the form of a box to thereby internally form a nuclear fuel storage 220 for storing the spent nuclear fuel assemblies 41, in which the working fluid is circulated inside the heat pipe plate 210 and absorbs the decay heat of the spent nuclear fuel assemblies 41.

Here, the respective unit storage racks 200 are arranged and close to each other in the storage space where the coolant for removing the decay heat of the spent nuclear fuel assemblies 41 is stored. Therefore, the whole lateral sides of the spent nuclear fuel 41 inserted and stored in each unit storage rack are in direct contact with the inner surfaces of the heat pipe plate 210, thereby more quickly removing the decay heat.

Also, the decay heat removal system 40 for cooling the spent fuel assemblies according to the second embodiment of the present invention may further include a third heat pipe 230 inserted in the control rod insertion hole 42 penetrating the middle of the spent fuel assemblies 41, and internally circulating the working fluid to absorb the decay heat from the inside of the spent fuel assemblies 41. Here, the control rod insertion hole 42 is a previously formed insertion hole in which the control rod can be inserted when the spent fuel assemblies 41 is arranged in the reactor vessel 10.

Further, the heat pipe plate 210 and the third heat plate 230 are provided in the form of the hybrid heat pipe internally provided with both the neutron absorber and the coolant, thereby having functions of not only absorbing the neutron generated in the spent fuel assemblies 41, but also removing the generated decay heat.

Also, a case material forming an outer appearance of the heat pipe plate 210 and the third heat plate 230 may include one of stainless steel, zirconium alloy, inconel alloy and molybdenum alloy, and a wick placed inside the heat pipe plate 210 and the third heat plate 230 and circulating the working fluid may include one of stainless steel, zirconium alloy, inconel alloy and molybdenum alloy. Also, the working fluid may include one of water ($H_2O$), a nanofluid, a refrigerant, mercury (Hg), lithium (Li) and FLiBe ($LiF-BeF_2$).

In the decay heat removal system 40 for cooling spent fuel with the foregoing elements and functions according to the second embodiment of the present invention, it is possible to more quickly and stably remove the decay heat of the spent fuel assemblies 41 and to absorb and remove the unnecessarily generated neutrons as compared with the store rack made of a metal plate and storing the spent fuel assemblies 41.

Next, elements and functions of a decay heat removal system 50 for cooling a nuclear power plant according to a third embodiment of the present invention will be described.

Figure 3:
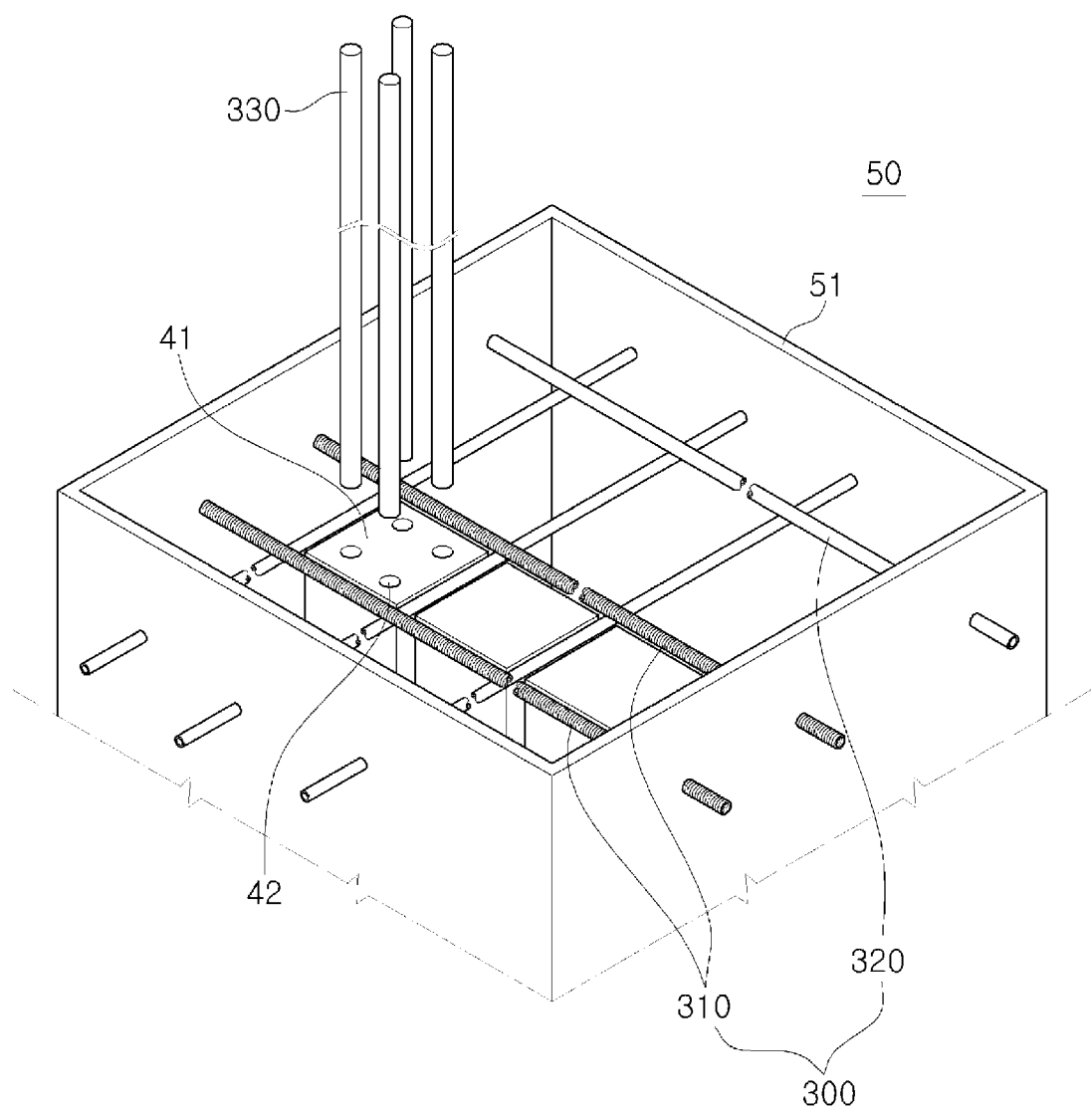
FIG. 3 is a perspective view showing a configuration of a decay heat removal system for cooling a nuclear fuel according to a third embodiment of the present invention.

Like the foregoing decay heat removal system 40 for cooling spent fuel assemblies according to the second embodiment, the decay heat removal system 50 for cooling the spent fuel assemblies according to the third embodiment of the present invention is a cooling system for removing the decay heat of the spent fuel assemblies 41. As shown in FIG. 3, the decay heat removal system 50 includes a storage container 51, a fourth heat pipe 310 and, a fifth heat pipe 320.

The storage container 51 is a container internally formed with a storage space for storing the spent fuel assemblies 41 and placing each heat pipe 310, 320, 330 therein. Further, the coolant for removing the decay heat of the spent fuel assemblies 41 may be supplied to and stored in the storage container 51.

The fourth heat pipe 310 is a cooling means arranged to be in close contact with each spent fuel assemblies 41 stored in the storage container 51 and removing the decay heat of the spent fuel assemblies 41. The fourth heat pipe 310 is horizontally arranged in the form of traversing the internal space of the storage container 51, and working fluid is circulated inside therein to absorb the decay heat of the spent fuel assemblies 41.

Also, the fifth heat pipe 320 is a cooling means arranged to be in close contact with each spent fuel assemblies 41 stored in the storage container 51 together with the fourth heat pipe 310 and removing the decay heat of the spent fuel assemblies 41. The fifth heat pipe 320 is horizontally arranged in the form of traversing the storage space of the storage container 51. As shown in FIG. 3, the fifth heat pipe 320 is installed in a direction of intersecting the fourth heat pipe 310, and, together with the fourth heat pipe 310, forms a rectangular storage space in which the spent fuel assemblies 41 is arranged.

Here, the fourth heat pipes 310 and the fifth heat pipes 320 are spaced apart from each other at a distance corresponding to a horizontal length of a storage unit for the spent fuel assemblies 41, and closely contact both sides of the spent fuel assemblies 41, thereby maximizing an efficiency of cooling the spent fuel assemblies 41.

Also, the decay heat removal system 50 for spent fuel assemblies according to the third embodiment of the present invention may further include a sixth heat pipe 330 inserted in the control rod insertion hole 42 penetrating the middle of the spent fuel assemblies 41, and internally circulating the working fluid to absorb the decay heat from the inside of the spent fuel assemblies 41. Here, the control rod insertion hole 42 is a previously formed insertion hole in which the control rod can be inserted when the spent fuel assemblies 41 is arranged in the reactor vessel 10.

Further, the fourth heat pipe 310, the fifth heat pipe 320 and the sixth heat pipe 330 are provided in the form of the hybrid heat pipe internally provided with both the neutron absorber and the coolant, thereby having functions of not only absorbing the neutron generated in the spent fuel assemblies 41, but also removing the generated decay heat.

Also, the fourth heat pipe 310, the fifth heat pipe 320 and the sixth heat pipe 330 may use seawater as a final heat removing source, in which the seawater is circulated inside an independent condenser cooling tank 140 as shown in FIG. 4.

For reference, FIG. 4 is a perspective view showing a configuration of a condenser cooling tank and a fin in the decay heat removal system for cooling the reactor core according to the present invention.

Further, a case material forming an outer appearance of the fourth heat pipe 310, the fifth heat pipe 320 and the sixth heat pipe 330 may include one of stainless steel, zirconium alloy, inconel alloy and molybdenum alloy, and a wick placed inside the fourth heat pipe 310, the fifth heat pipe 320 and the sixth heat pipe 330 and circulating the working fluid may include one of stainless steel, zirconium alloy, inconel alloy and molybdenum alloy. Also, the working fluid may include one of water ($H_2O$), a nanofluid, a refrigerant, mercury (Hg), lithium (Li) and FLiBe ($LiF-BeF_2$).

As described above, in the decay heat removal system with the hybrid heat pipe having the neutron absorber and the coolant for cooling reactor core and the spent fuel assemblies according to the present invention, the decay heat of the reactor core 11 arranged in the reactor vessel is removed the heat pipe, thereby preventing occurrence of a secondary accident due to vapor, and maximizing a cooling efficiency because the decay heat is removed by direct contact with the reactor core 11 generating the decay heat.

Also, the second heat pipe placed beneath the reactor vessel is made of a flexible material or has a bellows-like structure, and thus curved along the shape of the bottom surface of the nuclear reactor vessel, thereby improving a cooling efficiency through close contact.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A combination of a reactor vessel, a reactor core arranged in the reactor vessel, and a decay heat removal system for removing decay heat of the reactor core,
   wherein the reactor core includes a control rod insertion hole into which a control rod is allowed to be inserted,
   wherein the reactor vessel includes an insertion hole formed on a top thereof, and
   wherein the decay heat removal system comprises:
   a first heat pipe which is placed in an upper plenum of the reactor vessel and arranged vertically corresponding to a position of the insertion hole formed on the top of the reactor vessel and corresponding to a position of the control rod insertion hole;
   a control rod drive mechanism which is connected to an upper plenum of the first heat pipe and drives the first heat pipe to move up and down so that the first heat pipe is selectively inserted in the control rod insertion hole of the reactor core; and
   a second heat pipe which is coupled to and in close contact with a bottom surface of the reactor vessel and removes the decay heat generated in the reactor core,
   wherein the first heat pipe is a hybrid heat pipe which is internally provided with both a neutron absorber and a coolant, the first heat pipe not only absorbing a neutron generated in the reactor core by the neutron absorber but also removing the decay heat generated in the reactor core by the coolant.

2. The combination according to claim 1, wherein the first heat pipe receives the coolant from an upper plenum of the reactor vessel as a heat sink, and performs cooling by absorbing the decay heat generated in the reactor core, and transferring the absorbed heat to the coolant.

3. The combination according to claim 1, wherein a fin is provided in a condenser of the first heat pipe, which employs air, water, nanofluid, seawater, nitrogen or liquid metal as a coolant for exchanging heat with the first heat pipe.

4. The combination according to claim 1, wherein the second heat pipe is a hybrid heat pipe which is internally provided with both a neutron absorber and a coolant, the second heat pipe not only absorbing the neutron generated in the reactor core by the neutron absorber but also removing the decay heat by the coolant.

5. The combination according to claim 1, wherein the second heat pipe is made of a flexible material, is curved corresponding to the shape of the bottom surface of the reactor vessel, and closely contacts the bottom surface.

6. The combination according to claim 1, wherein the second heat pipe is curved corresponding to the shape of the bottom surface of the reactor vessel, and closely contacts the bottom surface.

7. The combination according to claim 4, wherein the coolant in the second heat pipe comprises one of water ($H_2O$), a nanofluid, a refrigerant, mercury (Hg), lithium (Li) and FLiBe ($LiF-BeF_2$).

8. The combination according to claim 1, wherein a wick placed in the first heat pipe comprises one of carbon fiber, copper, stainless steel, zirconium alloy, silicon carbide (SiC), and boron carbide ($B_4C$).

9. The combination according to claim 1, wherein a case material forming an outer appearance of the first heat pipe comprises one of stainless steel, zirconium alloy, inconel alloy and molybdenum alloy.

10. The combination according to claim 1, wherein the coolant in the first heat pipe comprises one of water (H2O), a nanofluid, a refrigerant, mercury (Hg), lithium (Li) and FLiBe (LiF-BeF2).

11. The combination according to claim 1, wherein a wick placed in the second heat pipe comprises one of carbon fiber, copper, stainless steel, zirconium alloy, silicon carbide (SiC), and boron carbide ($B_4C$).

12. The combination according to claim 1, wherein a case material forming an outer appearance of the second heat pipe comprises one of stainless steel, zirconium alloy, inconel alloy and molybdenum alloy.

\* \* \* \* \*